(12) United States Patent
Wacker

(10) Patent No.: US 6,826,920 B2
(45) Date of Patent: Dec. 7, 2004

(54) HUMIDITY CONTROLLER

(75) Inventor: Paul C. Wacker, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/314,604

(22) Filed: Dec. 9, 2002

(65) Prior Publication Data
US 2004/0108388 A1 Jun. 10, 2004

(51) Int. Cl.[7] .................. F25B 49/00; F25D 17/04
(52) U.S. Cl. .................. 62/176.6; 62/173; 62/186; 236/44 A; 236/44 C
(58) Field of Search ................. 62/176.6, 173, 62/93, 150, 186, 180; 236/44 C, 44 A

(56) References Cited

U.S. PATENT DOCUMENTS

| | | | | |
|---|---|---|---|---|
| 3,979,922 A | * | 9/1976 | Shavit | 62/97 |
| 4,300,623 A | | 11/1981 | Meckler | |
| 4,485,632 A | * | 12/1984 | Gallagher | 62/179 |
| 4,540,118 A | * | 9/1985 | Lortie et al. | 236/44 C |
| 4,549,601 A | * | 10/1985 | Wellman et al. | 165/205 |
| 5,257,958 A | * | 11/1993 | Jagers | 454/238 |
| 5,400,607 A | | 3/1995 | Cayce | |
| 5,850,968 A | * | 12/1998 | Jokinen | 236/44 C |
| 6,295,823 B1 | * | 10/2001 | Odom et al. | 62/176.6 |
| 6,415,617 B1 | * | 7/2002 | Seem | 62/186 |
| 6,604,688 B2 | * | 8/2003 | Ganesh et al. | 236/49.3 |
| 2003/0181158 A1 | * | 9/2003 | Schell et al. | 454/229 |

* cited by examiner

Primary Examiner—Marc Norman

(57) ABSTRACT

A humidity controller for an air handling unit of a space, room or zone. The controller may be a dehumidification system integrated with a constant volume air handling unit. The system may have separate actuator control of a mixed air damper and other actuator control for both an outdoor air intake damper and an indoor air exhaust damper. Humidity and temperature sensors may be placed outdoors and indoors in the space having air to be dehumidified, temperature controlled and/or mixed with outdoor air. An economizer controller may be connected to the sensors and actuators for controlling various properties of the air in the space. The air may be dehumidified by slowing down the movement of air across the cooling coil of the air handling unit.

66 Claims, 4 Drawing Sheets

HUMIDITY CONTROLLER

BACKGROUND

The present invention relates to climate controls for buildings and particularly to humidity controls. More particularly, the invention relates to humidity controls in conjunction with air handling units.

A large percentage of commercial buildings in the United States utilize Constant Volume Air Handling Units (CVAHU's) as their HVAC equipment. Also known as prepackaged single zone Roof Top Units (RTU's), these units may utilize a temperature controller (thermostat) which has the single control input of dry bulb temperature and a single controlled output which is the run time of the equipment. The thermostat may cycle the equipment on and off to regulate the dry bulb temperature of the air in the space. This equipment can have an indirect effect on the humidity in the controlled space during the cooling operation. Since the equipment manufacturers might realize that some moisture removal of the zone air which they are treating may be necessary during cooling season, the temperature of the cooling coils and the (constant) velocity of the air moving across them may be chosen such that a certain percentage of the cooling energy is used to remove moisture. The moisture removal that occurs during RTU run time for dry bulb control, however, may be an indirect result based on assumptions of average air moisture content and equipment run times for dry bulb temperature control of a commercial space and be a function of the cooling coil temperature and constant fan speed chosen. When moisture content is high and/or the thermostat does not run the equipment enough because of low dry bulb conditioning requirements, this indirect control of humidity in the zone is ineffective and the humidity will become too high.

During climate conditions of high humidity levels and relatively warm temperatures in a space, room, enclosure, zone or building, many air conditioners and air handling units have sufficient capacity to cool the space, enclosure or building but are incapable of keeping the humidity of air at a low comfortable level. The problem is readily apparent in the case of rooftop constant volume air handling units in many commercial establishments. Short of replacing the existing units with units with increased dehumidifying capabilities or with dehumidification equipment, there appears to date to be no easy, reasonable and efficient solution.

SUMMARY

The present invention may be an easy, reasonable and efficient solution for increasing the dehumidification capabilities of present air handling units including rooftop units. It may involve adding at least one extra air damper actuator, possibly an extra humidity sensor and a controller capable of controlling the various dampers of the system in a manner to further decrease humidity in the space, enclosure or building without modifying or replacing the air handling unit or climate controlling equipment.

The invention may be an apparatus, method or means that utilizes an air handling unit having a cooling mechanism and an air mover. It may have an intake air damper which may be adjusted to effectively change the speed of air movement through the cooling mechanism. It may have at least one humidity detector proximate to the space, room or zone to which the air handling unit is providing climate control. It may have a controller to appropriately control the damper for effecting a sought after humidity level. It may include outside or outdoor air dampers for bringing in outside or outdoor air into the space, room or zone. Also, there may be an exhaust air damper for sending air from the space, room or zone into the outdoor environment. There may be actuators to move the positions of the dampers as indicated by the controller. There may be other air parameter sensors connected to the controller for climate control of the space, room or zone.

DESCRIPTION

Figure 1:
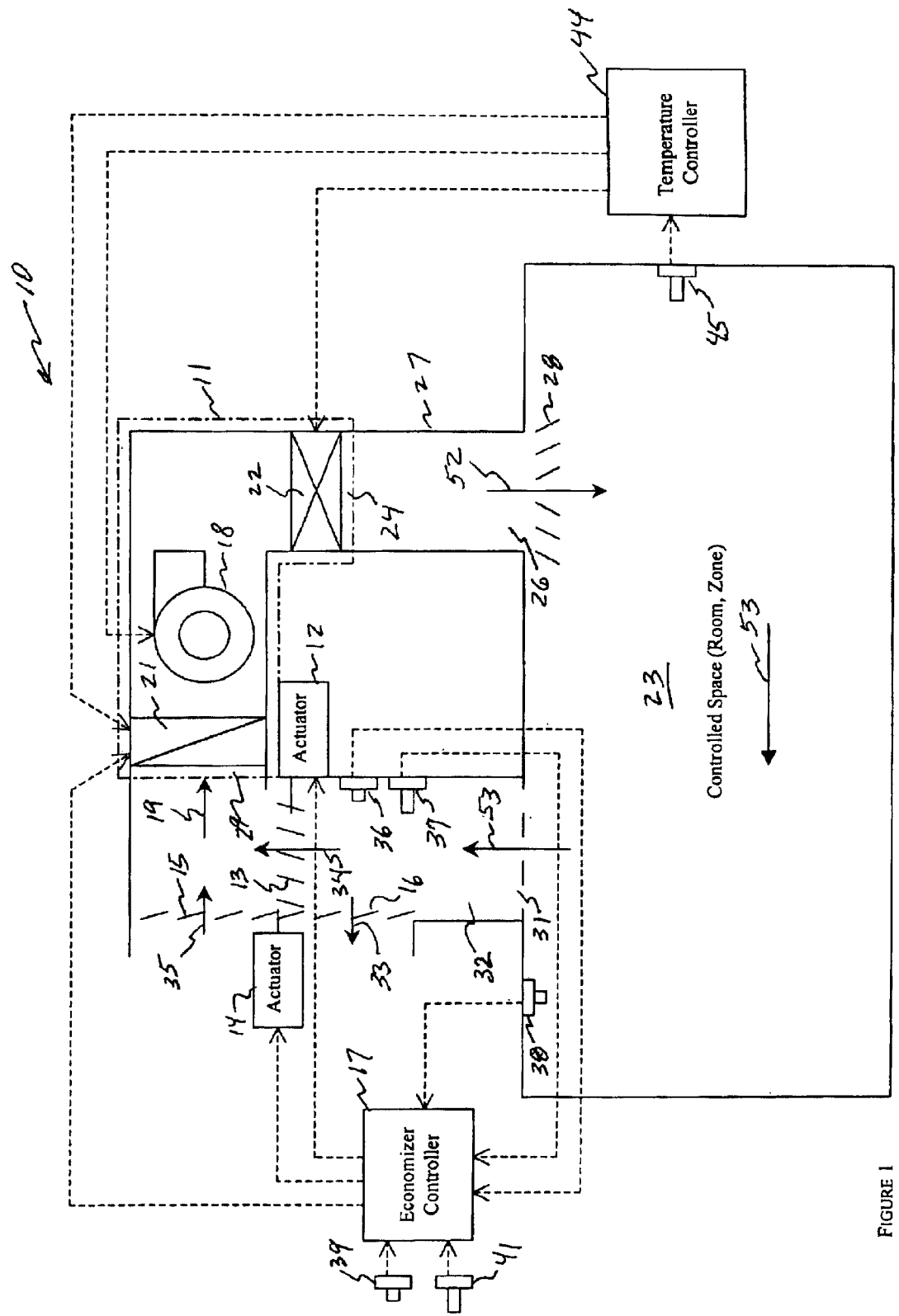
FIG. 1 shows an air handling unit having air flow control with three dampers, two actuators and two controllers.

In FIG. 1, a system 10 that may have a standard air handling unit 11 complemented with an actuator 12 connected to an intake or mixed air damper 13 is shown. An actuator 14 may be connected to an outdoor or outside air damper 15 and an exhaust air damper 16. Actuators 12 and 14 may be connected to an economizer controller 17.

An air pump or fan 18 of air handling unit 11 may draw mixed air 19 through input 29 of unit 11. Mixed air 19 may flow through or across a cooling coil or mechanism 21. Air 19 may flow from air supply fan 18 through a heating coil or heat exchanger 22. It becomes air flow or stream 52 (i.e., supply air) which may enter a controlled space, room or zone 23. Air 52 may enter space 23 from output 24 of unit 11 and be conveyed to inlet 26 via a supply air duct or conduit 27. Air 52 may enter a vent or inlet 26 into space 23 via a diffuser 28 which may spread or diffuse air 52 into various portions of space 23.

Air 52, after flowing into space 23, becomes part of zone air 53 which may exit space 23 via outlet 31 and move towards unit 11 via a duct or conduit 32. Some of air 53 may be let out of system 10 as exhaust air 33 to the outside or outdoor environment by exhaust air damper 16. Remaining air 34 goes through intake or mixed air damper 13. Air 35 may come in from the outdoor or outside environment through damper 15 to mix with air 34 to become mixed air 19 that enters air handling unit 11 via input 29.

The effect of system 10 may be to reduce humidity in air 19 as it goes through cooling coil or mechanism 21. Under typical conditions of unit 11 for space 23, air 19 may be cooled fairly rapidly into air 52 and moved on to space 23 and become part of zone air 53 as described above. However, very little moisture may be removed from air 19, and thus the humidity of air 53 may be more than desired. One way of reducing the humidity in air 53 is to slow the movement of air 19 through or across cooling coil or mechanism 21. This decrease in air 19 velocity or speed across cooling coil or coils 21 may cause a much larger percent of the energy to be used as latent cooling instead of sensible cooling and thus reduce the moisture content of air 19 and the humidity of air 53 in space 23. To cool the air itself is sensible cooling, and to remove moisture from the air or dehumidify it is latent cooling. The sensible cooling is dry bulb cooling. The sensible cooling effect is the difference between the total cooling effect and the dehumidifying effect.

Supply air fan 18 runs at one speed and thus unit 11 is a constant volume supplier of air 52. However, to reduce the fan 18 speed is not practical since that may require modification of the motor of fan 18. The approach here is to reduce the flow of air 19 stream through coiling coil 21 by restricting the flow of air 53, 34 and eventually 19 to input 29 of air handling unit 11. A combination of controlling dampers or air restrictors 13, 15 and 16 may be utilized in conjunction with an indication of the humidity of air 53 in space 23, and regulating the amount of moisture removal of air 19 to keep the humidity air 53 at a desirable level. If air restrictors 15 and 13, which may be moved together to alter the source of the air 19 to be input to fan 18 while keeping a constant pressure drop into fan 18 (as one restrictor opens the other may close), are both somewhat closed, then more drag or load may be put on the motor of supply fan 18 with an increased pressure difference across fan 18. This increased pressure drop across fan 18 may cause a lower volume of air to be pushed through fan 18 at the same fixed power supply conditions at fan 18 and hence reduce the velocity of air 19 across cooling coils 21. Reducing the velocity of air 19 across cooling coils 21 at a generally constant cool or cold temperature may cause more moisture to be removed from air 19 than would be removed under normal RTU run conditions.

An actuator 12 may be connected to damper 13 for closing and opening the damper via an electrical signal to actuator 12. An actuator 14 may be connected to damper 15 and damper 16 for closing and opening the dampers via electrical signals to actuator 14. Dampers 15 and 16 may open and close in unison in configurations 10 and 20 of FIGS. 1 and 2, respectively. The amount of fresh outside air 35 that comes into system 10 via damper 15 may approximately equal the amount of air 33 that is returned to the outside as exhaust via damper 16. The amounts of outside air 35 and exhaust air 33 should be about the same so that a differential pressure between space 23 and the outside environment is close to zero and does not build up. Tying the movements of both dampers 15 and 16 together may be sufficient for assuring somewhat equal amounts of air 35 entering and air 33 being exhausted to prevent a significant pressure differential existing between space 23 and the outside environment.

Actuators 12 and 14 may be connected to and controlled by economizer controller 17. Several sensors may also be connected to controller 17. A humidity sensor 36 and temperature sensor 37 in return air duct 32 may be connected to controller 17. An alternate humidity sensor 38 in space 23 near exit vent or outlet 31 may be connected, in lieu of sensor 36, to controller 17. Also connected to controller 17 may be an outdoor humidity sensor 39 and a temperature sensor 41. There may be various sensors for measuring various psychrometric parameters of inside and outside air such as dry-bulb temperature, dew-point temperature, wet-bulb temperature, humidity ratio, relative humidity, and enthalpy. One may determine differential enthalpy which may include comparing outside air temperature and humidity with the return air 53 temperature and humidity. Enthalpy is the total heat content of air, i.e., the sum of the enthalpies of dry air and water vapor, per unit of dry air as measured in BTU per pound (or calories per kilogram). So there should be a lowering of enthalpy when cooling. As to relative humidity, it is what is felt. It is the ratio of moisture in the air to the moisture capacity of air at a given temperature. The capacity of air to hold moisture decreases when the air becomes cooler. So for a given amount of moisture in the air, the relative humidity increases when the air temperature decreases. Besides sending control signals to actuators 12 and 14, controller 17 may send control signals to cooling coil or mechanism 21.

Figure 4:
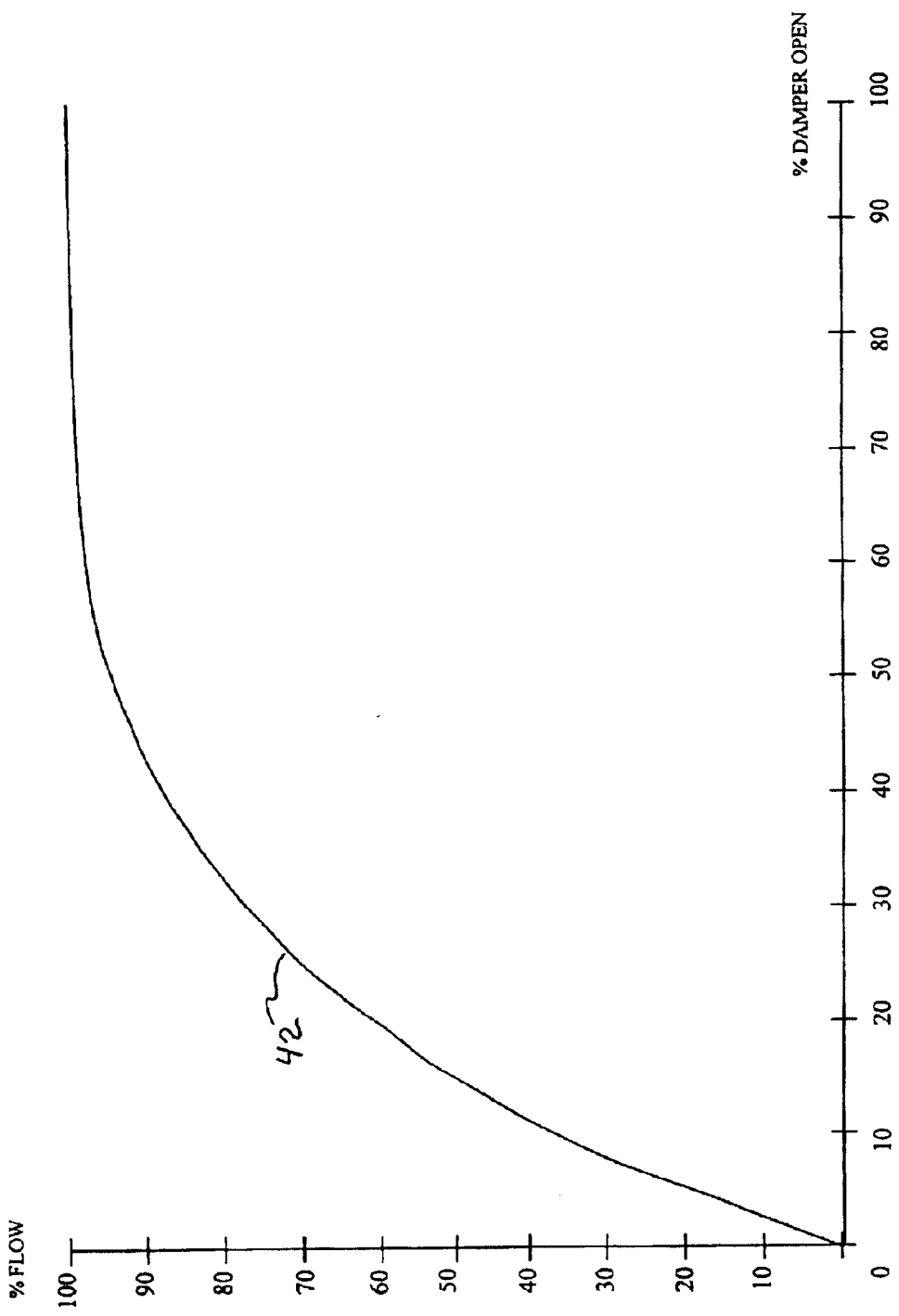
FIG. 4 is a typical graph of a percentage air flow through a damper versus a percentage of an opening of the damper.

The economizer controller 17 may, for example, provide a certain amount of fresh air 15, particularly if there are people in space 23, which may be accomplished with outside air damper 15 open at 15 percent, exhaust damper 16 open at 15 percent and internal damper 13 open at 75 percent. One may note that 15 or 75 percent open often does not correlate with 15 or 75 percent of total air flow for the respective damper. It may be a nonlinear relationship as illustrated by curve 42 of an example damper in FIG. 4. For instance, a damper opening of about 60 percent may result in about a 95 percent flow rate. So dealing in flow rates might be preferable to damper openings. A power exhaust at damper 16 to draw air 33 out to the outside or a fan at damper 15 to draw outside air 35 in may be utilized if desired.

Figure 3:
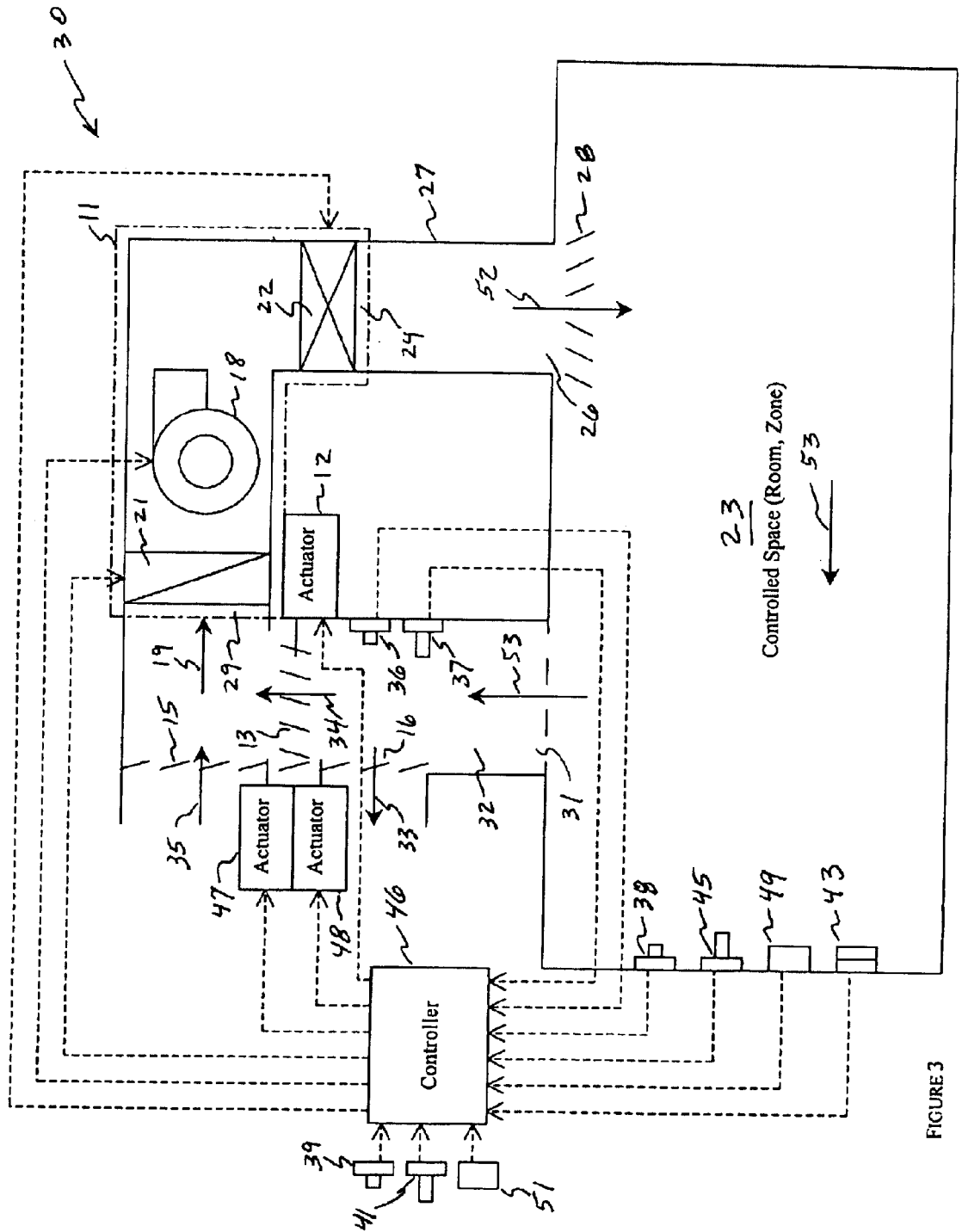
FIG. 3 shows the air handling unit having air flow control with three dampers, three actuators and one controller.

A $CO_2$ sensor 43 may be installed in space 23, as shown in FIG. 3, to evaluate the need for outside air 35 as determined by human occupancy of space 23 since $CO_2$ is a byproduct of human respiration, and therefore levels of $CO_2$ concentration in a space, such as space 23, may correlate well with occupancy levels in the space. Thus, outside air 35 intake amounts may be increased with an increase of occupancy level in space 23. However, if space 23 is unoccupied, outside dampers 15 and 16 may be closed via actuator 14.

Economizer controller 17 via sensors may note the enthalpy of outside air 35 and the enthalpy of inside air 53. If the enthalpy of outside air 35 is lower than that of air 53, then controller 17 may open damper 15 to bring in outside air. The enthalpies may be determined by sensors 39 and 41 for air 35 and sensors 36 and 37 for air 53. For instance, if outside air 35 at 75 degrees F. has low humidity, and return air 53 at 75 degrees F. has high humidity, then controller 17 may actuate dampers 15 and 16 to have greater open position to let in more outside air 35 for space 23. However, return or mix air damper 13 may be actualized into a more closed position to still maintain or reduce the velocity or speed of air 19 across or through cooling coil 21 to maintain the increased dehumidification effect of air handling unit 11.

System 10 may also have a temperature controller 44 for maintaining a certain temperature of air 53 in space 23. An indication of temperature in space 53 may be provided by temperature sensor 45 to controller 44. A desired temperature setting may be entered in temperature controller 44 which in turn may send signals out so as to effect the desired temperature of air 53 in space 23. Controller 44 may be connected to cooling coil or mechanism 21, supply fan 18 and heating coil or heat exchanger 22. So if space 23 needs its air 53 temperature to be decreased or increased relative to the temperature setting at controller 44, cooling coil 21 compressor may be turned or heating coil 22 may be turned on, respectively, to effect a temperature change. Supply fan 18 may be selected by controller 44 to be on only during a cooling or heating cycle or it may be selected to be on continuously. of course, fan 18 and cooling coil 21 may be on when the present dehumidification of system 10 is in effect. However, temperature controller 44 may override economizer controller 17. Settings for minimum humidity may be entered in economizer controller 17, for instance, 50 percent relative humidity. A delta setting may be between 5 and 10 percent. That means the dehumidification will not turn on or shut off until the humidity has changed a value, e.g., 7 percent from the previous turn off or turn on state. The dehumidification period may be set for a minimum amount of time such as, for example, ten minutes. If the desired set humidity level is attained prior to ten minutes, the level may continue to be lowered more until the ten minutes has elapsed. Often, there is no maximum time setting. If the air conditioner, i.e., cooling coil 21, is shut off, the controller 17 mode for dehumidification may remain the same when the air conditioner turns back on if the humidity is still above the desired set level.

Economizer 17 usually is used only on the cooling side, particularly in the case of using outside air 35 having lower enthalpy than that of inside air 53. Typically, commercial buildings have a need for cooling, even in the middle of a cold winter. Bigger buildings have less outside surface per unit volume than smaller buildings. Inside such buildings, people, computers, lights and various kinds of equipment generate significant amounts of heat. Thus, economizer 17 and the cooling portion of controller 44 may have year-round application.

Figure 2:
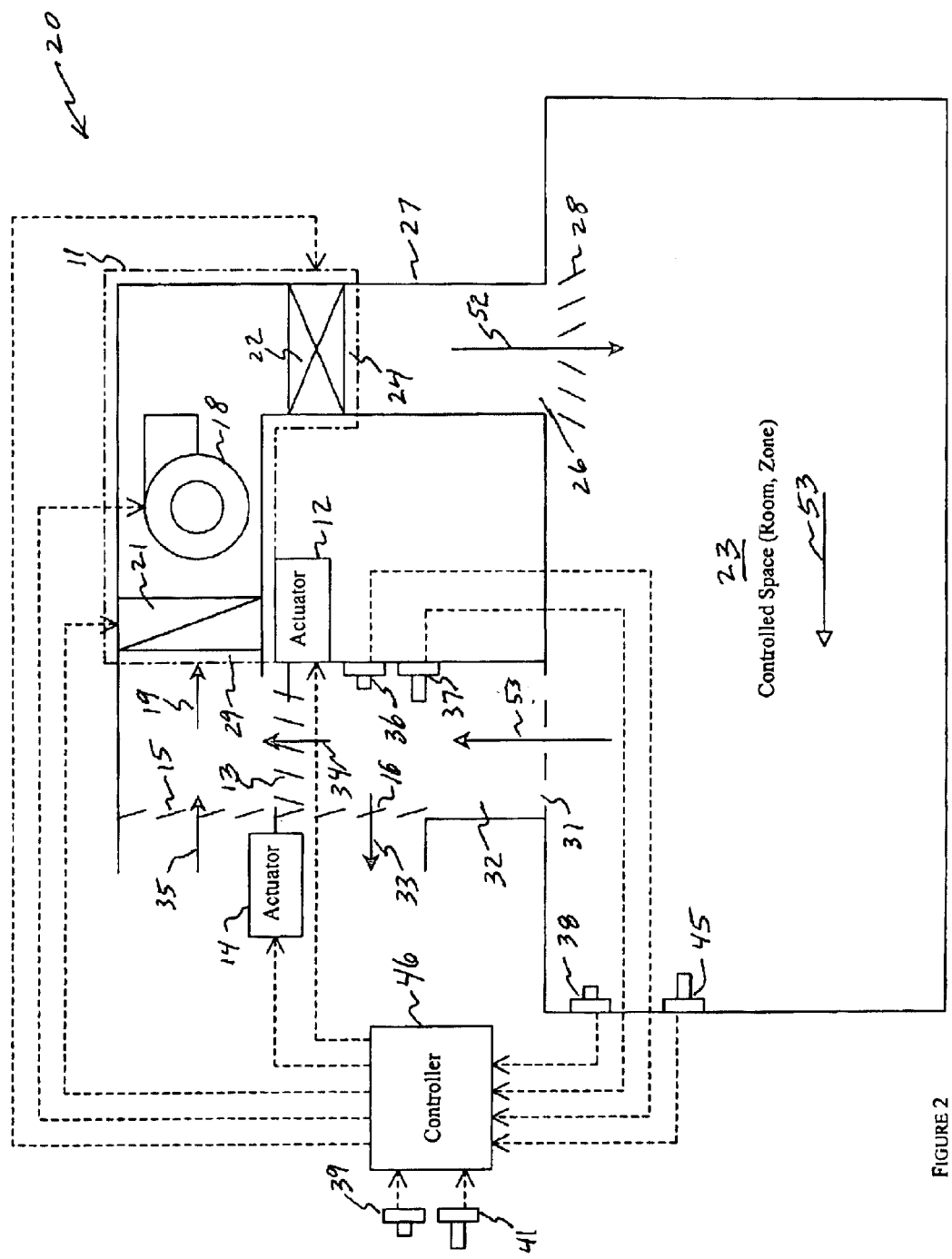
FIG. 2 shows the air handling unit having air flow control with three dampers, two actuators and one controller.

FIG. 2 shows a system 20 that may be the same as system 10 except that controllers 17 and 44 are combined into one controller 46. The hardware control and software of the economizer and temperature control sub-systems may be integrated to realize the advantages and synergies of the sub-systems.

System 30 of FIG. 3 is similar to system 20; however, system 30 may have separate actuators 47 and 48 for controlling dampers 15 and 16, respectively. A pressure sensor 49 in space 23 and a pressure sensor 51 outdoors may provide signals to controller 46 which may process a differential pressure indication between space 23 and the outside environment. As a result, controller 46 may send signals to actuators 47 and 48 to separately adjust dampers 15 and 16, respectively, to reduce and maintain the differential pressure close to zero in a continuous manner. On the other hand, a differential pressure of another value may be maintained for one reason or another.

Although the invention has been described with respect to at least one illustrative embodiment, many variations and modifications will become apparent to those skilled in the art upon reading the present specification. It is therefore the intention that the appended claims be interpreted as broadly as possible in view of the prior art to include all such variations and modifications.

What is claimed is:

1. A system for controlling humidity of air from an output of an air handling unit having a cooling mechanism and an air mover, comprising:

a first damper proximate to an input of the air handling unit;

a first actuator connected to said first damper;

a humidity sensor proximate to the output of the air handling unit; and a controller connected to said first actuator and humidity sensor; and wherein:

adjusting said first damper affects a speed of air moving through the cooling mechanism;

decreasing the speed of air moving through the cooling mechanism decreases humidity of the air from the output of the air handling unit; and increasing the speed of air moving through the cooling mechanism increases humidity of the air from the output of the air handling unit.

2. The system of claim 1, wherein:

a pre-determined humidity may be set on said controller;

if said humidity sensor indicates a humidity greater than the pre-determined humidity, then said controller will have said actuator move said first damper towards a close position which in turn will decrease the speed of air moving through the cooling mechanism; and if said humidity sensor indicates a humidity less than the pre-determined humidity, then said controller will have said actuator to move said first damper towards an open position which in turn will increase the speed of air moving through the cooling mechanism.

3. A system for controlling humidity of air in a space comprising:

an air mover having an input, a cooling mechanism and an output connected to the inlet of the space;

a first air flow adjustor proximate to the input of said air mover and the outlet of the space;

a second air flow adjuster proximate to an outside supply of air, to said first air flow adjuster and to the input of said air mover;

a third air flow adjuster proximate to the outlet of the space, to the outside supply of air and to said first air flow adjuster;

a first actuator connected to said first air flow adjuster;

a second actuator connected to said second and third air flow adjusters;

a controller connected to said first and second actuators; and a humidity sensor situated in the space and connected to said controller.

4. The system of claim 3, wherein:

said first air flow adjuster controls an amount of air flow from the outlet of the space to the input of said air mover;

said second air flow adjuster controls an amount of air flow from the outside supply of air to the input of said air mover; and said third air flow adjuster controls an amount of air flow from the outlet of the space to the outside supply of air.

5. The system of claim 4, wherein said controller has an adjustable humidity control setting.

6. The system of claim 5, wherein controlling an amount of air to the input of said air mover affects a speed of air moving across the cooling mechanism.

7. The system of claim 6, wherein changing the speed of air moving across the cooling mechanism effects a change of humidity in the air.

8. The system of claim 7, wherein if a humidity as indicated by said humidity sensor is different than the humidity indicated by the adjustable humidity control setting, then said controller will change via at least one of said first and second actuators and in turn at least one of said first, second and third air flow adjusters, the speed of air moving across the cooling mechanism until the humidity as indicated by the humidity sensor is approximately the same as the humidity as indicated by the adjustable humidity control setting.

9. The system of claim 8, further comprising:

a second humidity sensor, situated in the outside supply of air, connected to said controller;

a first temperature sensor, situated proximate to the outlet of the space, connected to said controller; and a second temperature sensor, situated in the outside supply of air, connected to said controller.

10. The system of claim 9, wherein:

said controller has an adjustable outside air amount setting; and said controller, via at least one of said first and second actuators and in turn at least one of said first, second and third air flow adjusters, will change the amount of outside air going to the input of said air mover to be approximately the same as an amount indicated by the adjustable outside air amount setting.

11. The system of claim 9, wherein:
said controller determines a certain amount of outside air to go to the input of said air mover according to indications from said humidity sensor and second humidity sensor and from said first and second temperature sensors; and
said controller will, via at least one of said first and second actuators and in turn at least one of said first, second and third air flow adjusters, change the amount of outside air going to the input of said air mover to be approximately the same as the certain amount of outside air as determined by said controller.

12. The system of claim 11, wherein said controller is connected to the cooling mechanism.

13. The system of claim 12, wherein said air mover further has a fan and a heating mechanism.

14. The system of claim 13, further comprising:
a second controller connected to the cooling mechanism, the fan and the heating mechanism;
a third temperature sensor, situated in the space, connected to said second controller.

15. The system of claim 14, wherein said controller and second controller control the humidity, the temperature, and the amount of outside air in the space.

16. The system of claim 15, wherein said controller and second controller are integrated into a one controller.

17. The system of claim 16, further comprising:
a third humidity sensor, situated in the space, connected to said one controller; and
a third actuator connected to said third air flow adjuster and to said one controller, wherein said second actuator is not connected to said third air flow adjuster.

18. The system of claim 17, wherein said one controller comprises:
a modifiable program; and
an input mechanism for inputting manual or automatic settings for humidity, temperature, amount of outside air and pressure in the space.

19. The system of claim 18, further comprising a $CO_2$ sensor, situated in the space, connected to said one controller.

20. The system of claim 19, wherein:
said $CO_2$ sensor indicates to said one controller an amount of $CO_2$ in the air of the space; and
said one controller controls the amount of $CO_2$ in the air of the space by controlling the amount of outside air brought into the space.

21. The system of claim 20, wherein said air mover is a constant volume air handling unit.

22. A method for controlling a climate control system for an enclosure, the climate control system including one or more conduits for passing an air stream past one or more cooling coils for cooling and/or dehumidifying the air stream, the method comprising the steps of:
activating the one or more cooling coils to cool and/or dehumidify the air stream; and
selectively restricting the air flow in the one or more conduits to reduce the velocity of the air stream past the one or more cooling coils for increased dehumidification.

23. The method of claim 22, wherein the one or more conduits access inside air from inside the enclosure and outside air from outside the enclosure, the method further comprising the step of mixing inside air with outside air to form the air stream.

24. The method of claim 23, wherein the selectively restricting step selectively restricts the air stream.

25. The method of claim 23, wherein the selectively restricting step selectively restricts the inside air flow.

26. The method of claim 23, wherein the selectively restricting step selectively restricts the outside air flow.

27. The method of claim 23, wherein the selectively restricting step selectively restricts the inside air flow and the outside air flow.

28. The method of claim 23, wherein each of the one or more conduits includes one or more dampers for selectively restricting the air stream, and wherein at least one of the dampers restricts the inside air flow and at least one of the dampers restricts the outside air flow.

29. The method of claim 28, wherein the selectively restricting step activates the one or more dampers to selectively restrict the air stream.

30. The method of claim 28, wherein the selectively restricting step activates the one or more dampers to selectively restrict either the inside air flow or the outside air flow without a corresponding increase in the other air flow.

31. The method of claim 28, wherein the selectively restricting step activates the one or more dampers to selectively restricts the inside air flow and the outside air flow.

32. The method of claim 28, further comprising the steps of:
determining a measure of one or more psychrometric properties of the outside air;
determining a measure of one or more psychrometric properties of the inside air; and
determining the velocity of the air stream as a function of:
the measure of the one or more psychrometric properties of the outside air; and
the measure of the one or more psychrometric properties of the inside air.

33. The method of claim 32, wherein the climate control system includes a controller for controlling the position of the one or more dampers, the method further comprising the step of selectively activating the one or more dampers to provide the determined velocity of the air stream.

34. The method of claim 32, wherein the one or more psychrometric properties is selected from the group consisting of: dry-bulb temperature, dew-point temperature, wet-bulb temperature, humidity ratio, relative humidity, and enthalpy.

35. The method of claim 22, wherein the one or more conduits includes one or more dampers for selectively restricting the air stream.

36. The method of claim 35, wherein the climate control system includes a controller for controlling the position of the one or more dampers.

37. The method of claim 22, comprising the step of determining a measure of one or more psychrometric properties of the air stream exiting the last of the one or more cooling coils.

38. The method of claim 37, further comprising the step of determining and setting the velocity of the air stream as a function of the measure of the one or more psychrometric properties.

39. The method of claim 38, wherein the climate control system includes a controller for controlling the position of the one or more dampers, the method further comprising the step of selectively activating the one or more dampers to provide the determined velocity of the air stream.

40. The method of claim 37, wherein the one or more psychrometric properties is selected from the group consisting of: dry-bulb temperature, dew-point temperature, wet-bulb temperature, humidity ratio, relative humidity, and enthalpy.

41. An apparatus for controlling a climate control system for an enclosure, the climate control system including one or more conduits for passing an air stream past one or more cooling coils for cooling and/or dehumidifying the air stream, the apparatus comprising:
   means for activating the one or more cooling coils to cool and/or dehumidify the air stream; and
   means for selectively restricting the air flow in the one or more conduits to reduce the velocity of the air stream past the one or more cooling coils for increased dehumidification.

42. The apparatus of claim 41, wherein the one or more conduits access inside air from inside the enclosure and outside air from outside the enclosure, the apparatus further comprising means for mixing inside air with outside air to form the air stream.

43. The apparatus of claim 42, wherein the means for selectively restricting the air flow selectively restricts the air stream.

44. The apparatus of claim 42, wherein the means for selectively restricting the air flow selectively restricts the inside air flow.

45. The apparatus of claim 42, wherein the means for selectively restricting the air flow selectively restricts the outside air flow.

46. The apparatus of claim 42, wherein the means for selectively restricting the air flow selectively restricts the inside air flow and the outside air flow.

47. The apparatus of claim 42, wherein the means for selectively restricting the air flow includes one or more dampers in each of the one or more conduits.

48. The apparatus of claim 47, wherein the one or more dampers selectively restrict the air stream, and wherein at least one of the dampers restricts the inside air flow and at least one of the dampers restricts the outside air flow.

49. The apparatus of claim 47, wherein the means for selectively restricting the air flow includes means for activating the one or more dampers to restrict the air stream.

50. The apparatus of claim 47, wherein the means for selectively restricting the air flow includes means for activating the one or more dampers to restrict either the inside air flow or the outside air flow without a corresponding increase in the other air flow.

51. The apparatus of claim 47, wherein the means for selectively restricting the air flow includes means for activating the one or more dampers to restrict the inside air flow and the outside air flow.

52. The apparatus of claim 47, comprising:
   means for determining a measure of one or more psychrometric properties of the outside air;
   means for determining a measure of one or more psychrometric properties of the inside air; and
   means for determining the velocity of the air stream as a function of:
      the measure of the one or more psychrometric properties of the outside air; and
      the measure of the one or more psychrometric properties of the inside air.

53. The apparatus of claim 52, wherein the climate control system includes a controller for controlling the position of the one or more dampers, the apparatus further comprising means for selectively activating the one or more dampers to provide the determined velocity of the air stream.

54. The apparatus of claim 52, wherein the one or more psychrometric properties is selected from the group consisting of: dry-bulb temperature, dew-point temperature, wet-bulb temperature, humidity ratio, relative humidity, and enthalpy.

55. The apparatus of claim 52, wherein the means for determining a measure of one or more psychrometric properties is a dry-bulb temperature sensor.

56. The apparatus of claim 52, wherein the means for determining a measure of one or more psychrometric properties is a wet-bulb temperature sensor.

57. The apparatus of claim 52, wherein the means for determining a measure of one or more psychrometric properties is a dew-point temperature sensor.

58. The apparatus of claim 52, wherein the means for determining a measure of one or more psychrometric properties is a relative humidity sensor.

59. The apparatus of claim 41, wherein the one or more conduits includes one or more dampers for selectively restricting the air stream.

60. The apparatus of claim 59, wherein the climate control system includes a controller for controlling the position of the one or more dampers.

61. The apparatus of claim 59, comprising means for determining a measure of one or more psychrometric properties of the air stream exiting the last of the one or more cooling coils.

62. The apparatus of claim 61, further comprising means for determining the velocity of the air stream as a function of the measure of the one or more psychrometric properties of the air stream.

63. The apparatus of claim 62, wherein the climate control system includes a controller for controlling the position of the one or more dampers, the apparatus further comprising means for selectively activating the one or more dampers to provide the determined velocity of the air stream.

64. The apparatus of claim 61, wherein the one or more psychrometric properties is selected from the group consisting of: dry-bulb temperature, dew-point temperature, wet-bulb temperature, humidity ratio, relative humidity, and enthalpy.

65. A system for controlling humidity of air from an output of an air handling unit having a cooling mechanism and an air mover, comprising:
   a first damper proximate to an input of the air handling unit;
   a first actuator connected to said first damper;
   a humidity sensor proximate to the output of the air handling unit; and
   a controller connected to said first actuator and humidity sensor; and
   wherein:
   adjusting said first damper affects a speed of air moving through the cooling mechanism;
   decreasing the speed of air moving through the cooling mechanism decreases humidity of the air from the output of the air handling unit; and
   increasing the speed of air moving through the cooling mechanism increases humidity of the air from the output of the air handling unit.

66. The system of claim 65, wherein:
   a pre-determined humidity may be set on said controller;
   if said humidity sensor indicates a humidity greater than the pre-determined humidity, then said controller will have said actuator move said first damper towards a close position which in turn will decrease the speed of air moving through the cooling mechanism; and if said humidity sensor indicates a humidity less than the pre-determined humidity, then said controller will have said actuator to move said first damper towards an open position which in turn will increase the speed of air moving through the cooling mechanism.

* * * * *